United States Patent [19]

Ide

[11] Patent Number: 5,364,128
[45] Date of Patent: Nov. 15, 1994

[54] REAR PORTION STRUCTURE OF VEHICLE

[75] Inventor: Yoshikazu Ide, Hiroshima, Japan

[73] Assignee: Mazda Motor Corporation, Hiroshima, Japan

[21] Appl. No.: 903,922

[22] Filed: Jun. 26, 1992

[30] Foreign Application Priority Data

Jun. 29, 1991 [JP] Japan .................................. 3-185313

[51] Int. Cl.⁵ ........................ B62D 21/15; B62D 25/08
[52] U.S. Cl. .................................. 280/784; 280/781; 280/834; 296/188; 296/195; 296/204
[58] Field of Search ............... 280/784, 781, 797, 796, 280/834, 91; 296/188, 204, 195

[56] References Cited

U.S. PATENT DOCUMENTS

| | | | |
|---|---|---|---|
| 3,811,698 | 5/1974 | Glance | 280/784 |
| 4,106,807 | 8/1978 | Sakurai | 296/204 |
| 4,787,643 | 11/1988 | Shirata | 280/834 |
| 4,906,018 | 3/1990 | Kijima et al. | 280/781 X |
| 5,012,885 | 5/1991 | Hilden | 280/91 X |
| 5,042,837 | 8/1991 | Kleinschmidt et al. | 280/784 |
| 5,110,177 | 5/1992 | Akio | 280/784 X |
| 5,174,628 | 12/1992 | Hayatsugu et al. | 296/188 |

FOREIGN PATENT DOCUMENTS

| | | | |
|---|---|---|---|
| 4030740 | 4/1991 | Germany | 280/784 |
| 0030875 | 2/1983 | Japan | 296/195 |
| 0279469 | 11/1990 | Japan | 280/781 |
| 0118280 | 5/1991 | Japan | 296/195 |
| 0169379 | 6/1992 | Japan | 280/781 |

*Primary Examiner*—Kenneth R. Rice
*Assistant Examiner*—Peter C. English

[57] ABSTRACT

A rear portion structure of a vehicle which can increase the coupling strength between rear side frames and a rear suspension cross member, and can reinforce the rear side frames. The vehicle rear portion structure includes a pair of right and left rear side frames arranged to extend along right and left side portions of a rear portion of a vehicle body, and with kick-up portions. A rear suspension cross member, has attaching portions attached to intermediate portions of the kick-up portions of the rear side frames, and which is arranged to extend in a direction substantially perpendicular to the longitudinal direction of the rear side frames.

9 Claims, 5 Drawing Sheets

REAR PORTION STRUCTURE OF VEHICLE

BACKGROUND OF THE INVENTION

1. Field of the Invention

The present invention relates to a rear portion structure of a vehicle and, more particularly, to a rear portion structure of a vehicle, which can increase the coupling strength between rear side frames of a kick-up frame structure and a rear suspension cross member, and can reinforce kick-up portions of the rear side frames.

2. Description of the Related Art

Conventionally, a frame structure, called a kick-up frame structure, is known. In this structure, a frame is bent upward at a portion where the rear axle is arranged so as to attain a low-floor structure. The kick-up frame structure is applied not only to buses having a frame structure but also to passenger vehicles. Especially in a passenger vehicle, the following technique is known. That is, a pair of right and left rear side frames arranged at the right and left side portions of a rear portion of a vehicle body adopt a kick-up frame structure, and the pair of right and left rear side frames are coupled and fixed through a rear suspension cross member. More specifically, a kick-up portion, which is inclined upward toward the back, is formed on an intermediate portion of each of the right and left rear side frames. The rear suspension cross member is fastened by bolts to the lower surfaces of rear portions of the kick-up portions of the right and left rear side frames using attaching holes formed in the right and left end portions of the rear suspension cross member.

A spare tire storage portion for storing a spare tire is arranged near the rear end portion of a vehicle as a side behind the rear suspension cross member. In addition, a fuel tank is normally arranged below the kick-up portions at the passenger room side as a side in front of the rear suspension cross member. When a vehicle is a rear-wheel drive vehicle or a four-wheel drive vehicle, a differential device or the like is arranged behind the rear suspension cross member. The above-mentioned structure is a popular structure employed in a rear portion structure of a conventional vehicle.

SUMMARY OF THE INVENTION

However, in the above-mentioned rear portion structure of the conventional vehicle or passenger vehicle, the rear suspension cross member is fastened and fixed by bolts to the lower surfaces of rear portions of the kick-up portions of the right and left rear side frames using attaching portions formed on the right and left end portions of the rear suspension cross member, and the spare tire storage portion is arranged behind the rear suspension cross member. For this reason, a shock load upon rear collision directly acts on the rear suspension cross member through the spare tire storage portion. As a result, it is expected that the rear suspension cross member is undesirably moved relative to the fuel tank or the passenger room. More specifically, it is desirable to increase the coupling strength of the rear cross member to the rear side frames in consideration of low safety upon rear collision.

It is also desirable to strengthen a reinforcement structure of the kick-up portions to relax a load condition of the kick-up portions with respect to a shock load upon rear collision since the above-mentioned kick-up portions are formed on the right and left rear side frames.

The present invention has been made in consideration of the above situation, and, therefore, has as its object to provide a rear portion structure of a vehicle, which can increase the coupling strength between rear side frames and a rear suspension cross member, and can reinforce the rear side frames.

It is another object of the present invention to provide a rear portion structure of a vehicle, which can sufficiently withstand a load upon rear collision.

It is still another object of the present invention to provide a rear portion structure of a vehicle, which can assure safety of passengers upon rear collision.

In order to achieve the above objects, a rear portion structure of a vehicle according to the present invention is arranged as follows. That is, the rear portion structure of a vehicle comprises a pair of right and left rear side frames arranged to extend along right and left side portions of a rear portion of a vehicle body, and having a kick-up frame structure, and a rear suspension cross member, at least portions of attaching portions of which are attached to intermediate portions of kick-up portions of the rear side frames, and which is arranged to extend in a direction substantially perpendicular to a longitudinal direction of the rear side frames.

Preferably, a rear portion structure of a vehicle having a multi-link rear suspension device, comprises a pair of right and left rear side frames arranged to extend along right and left side portions a rear portion of a vehicle body, and having a kick-up frame structure, a rear suspension cross member, at least portions of attaching portions of which are attached to intermediate portions of kick-up portions the rear side frames, and which is arranged to extend in a direction substantially perpendicular to a longitudinal direction of the rear side frames, and bracket members, arranged on the rear suspension cross member, for axially holding portions of a link of the rear suspension device.

Other features and advantages of the present invention will be apparent from the following description taken in conjunction with the accompanying drawings, in which like reference characters designate the same or similar parts throughout the figures thereof.

The present invention is not limited to the following embodiment, and various other arrangements may be employed within the spirit and scope of claims.

DETAILED DESCRIPTION OF THE PREFERRED EMBODIMENT

The preferred embodiment of the present invention will be described below with reference to the accompanying drawings, in this embodiment, a rear portion structure of a vehicle according to the present invention is applied to a front-wheel drive vehicle. Prior to a description, the forward moving direction of a vehicle is defined as forward (to be indicated by an arrow F hereinafter), the backward moving direction is defined as backward, and the widthwise direction of a vehicle is defined as a right-and-left direction.

Figure 1:
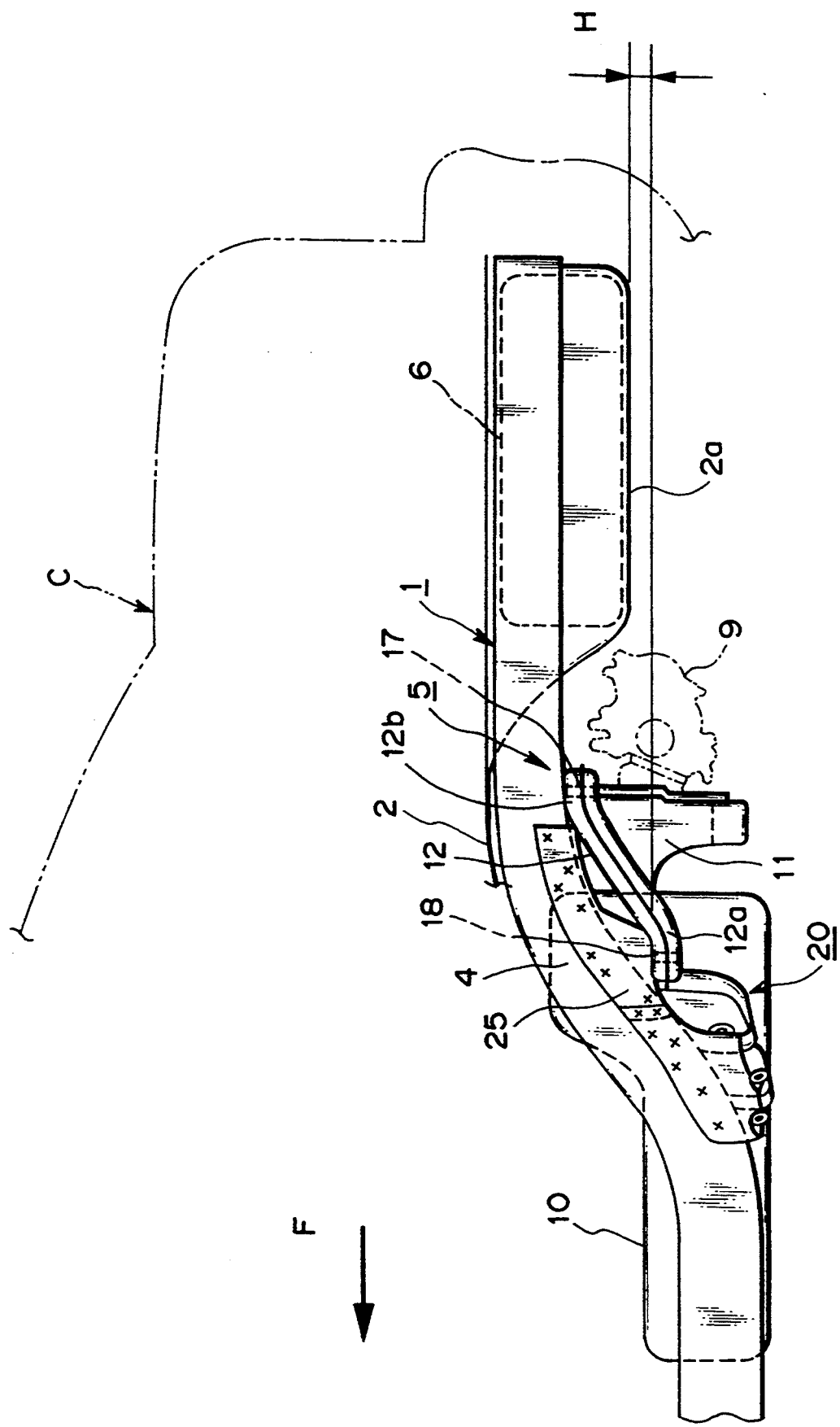
FIG. 1 is a longitudinal sectional view of a rear portion of a vehicle.
Figure 2:
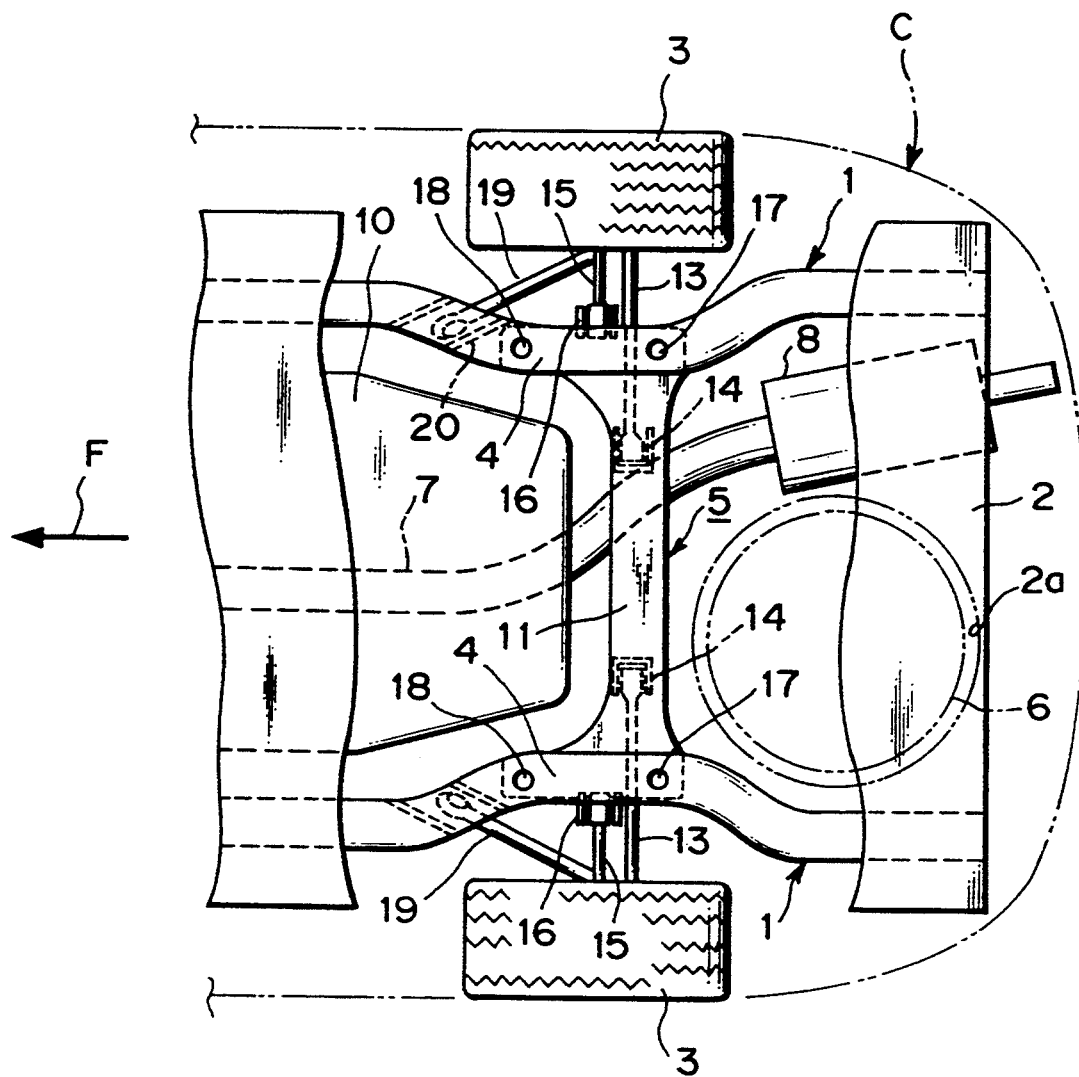
FIG. 2 is a partially cutaway plan view of FIG. 1.

As shown in FIGS. 1 and 2, a pair of right and left rear side frames are arranged in the right and left side portions of the rear portion of a vehicle body of a vehicle C, so that their longitudinal direction extends parallel to the back-and-forth (forward- and reverse) direction of the vehicle C. A rear suspension cross member 5 is fixed to the lower surfaces of the right and left rear side frames 1 at its right and left end portions, and extends in the widthwise (right-and-left) direction of the vehicle C. Kick-up portions 4, which are inclined upward toward the back, are respectively formed in the intermediate portions of the right and left rear side frames 1, thus constituting a so-called kick-up frame structure. A floor 2 constituting a floor portion is fixed on the upper ends of the right and left rear side frames 1.

A spare tire storage portion 2a is formed in the floor 2 located behind and near the rear suspension cross member 5, and stores a spare tire 6. As shown in FIG. 2, a silencer 8 inserted in an exhaust pipe 7 is arranged on the right side of the spare tire storage portion 2a, and a rear-wheel steering unit 9 is arranged on the rear suspension cross member 5, as indicated by an alternate long and short dashed line in FIG. 1. A fuel tank 10 is arranged on a portion in front of the rear suspension cross member 5 and below a rear portion of a passenger room.

Figure 3:
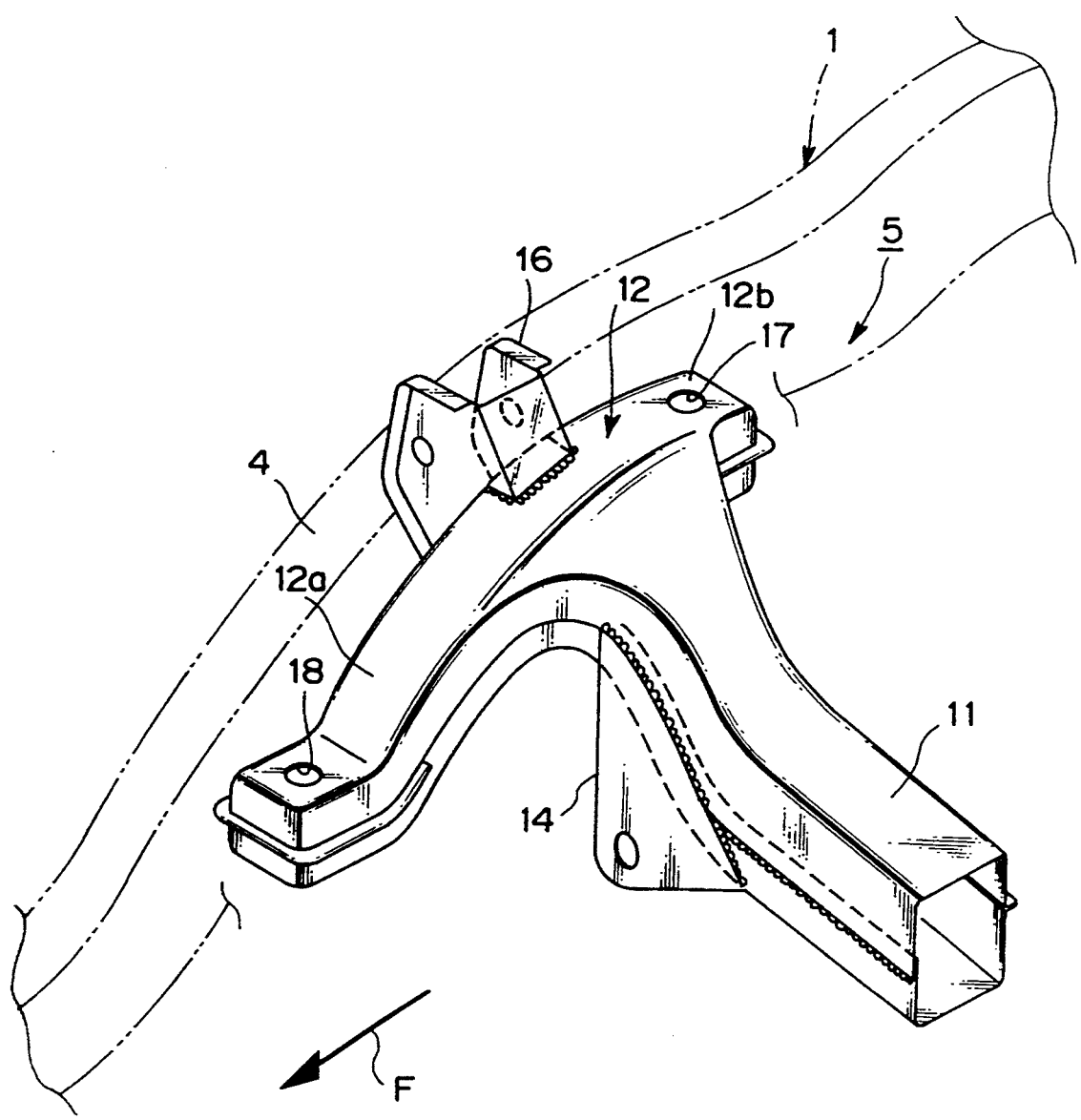
FIG. 3 is a perspective view showing the principal part of a rear suspension cross member.

As shown in FIG. 3, the rear suspension cross member 5 is arranged between the right and left kick-up portions 4 of the right and left rear side frames 1 indicated by an alternate long and two short dashed line in FIG. 3. The rear suspension cross member 5 is constituted by a lateral frame portion 11 having a substantially square closed sectional shape, and longitudinal frame portions 12 which are integrally formed at the right and left end portions of the lateral frame portion 11, and each of which has a forward arm portion 12a integrally extending forward toward the front end side to be inclined downward, and a backward arm portion 12b extending backward.

Each longitudinal frame portion 12 is arranged under the corresponding rear side frame 1. Brackets 14 for axially supporting lower arm members 13 (FIG. 2) of a rear suspension device are joined by welding to portions of the lateral frame portion 11 near its right and left end portions. Brackets 16 for axially supporting upper arm members 15 (FIG. 2) of the rear suspension device are joined by welding to the intermediate portions of the longitudinal frame portions 12 in the back-and-forth direction. Furthermore, bolt insertion holes 17 and 18 are respectively formed at predetermined positions on the rear end portion of the backward arm portion 12b of the longitudinal frame portion 12, and on a flat front end portion of the forward arm portion 12a of the longitudinal frame portion 12.

Figure 4:
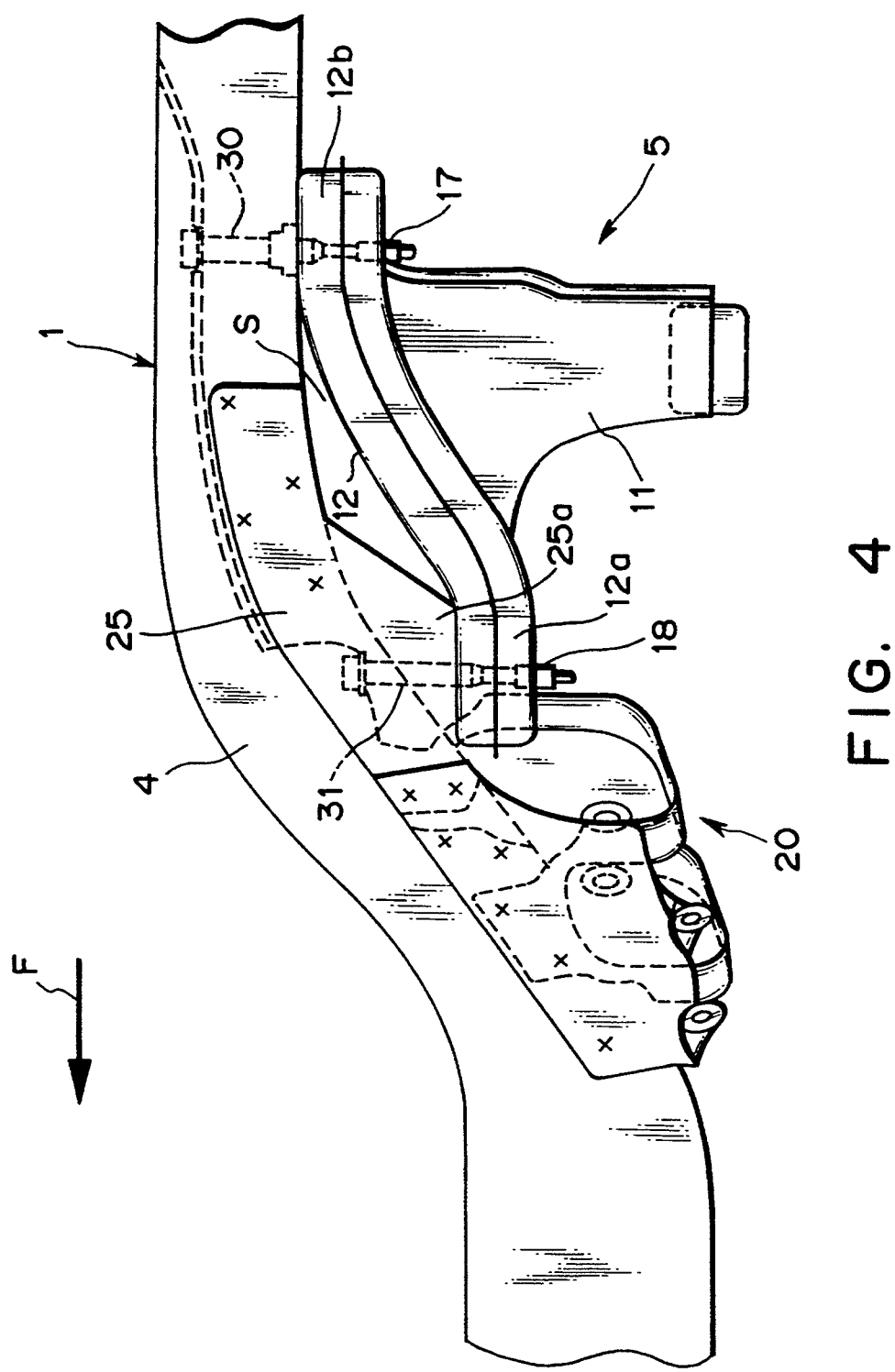
FIG. 4 is an enlarged view of the principal part of the cross member of FIG. 1.

As shown in FIG. 4, attaching brackets 20 for axially supporting a trailing arm 19 (FIG. 2) of the rear suspension device are fixed by welding to the lower front portions of the right and left kick-up portions 4. A reinforcement bracket 25 for fixing the attaching portion of the forward arm portion 12a of the longitudinal frame portion 12 is fixed by welding to a portion between substantially the central portion and the rear end portion of each of the right and left kick-up portions 4. The front end portion of this reinforcement bracket 25 is joined by welding to the rear end of the corresponding attaching bracket 20 to overlap each other.

Figure 5:
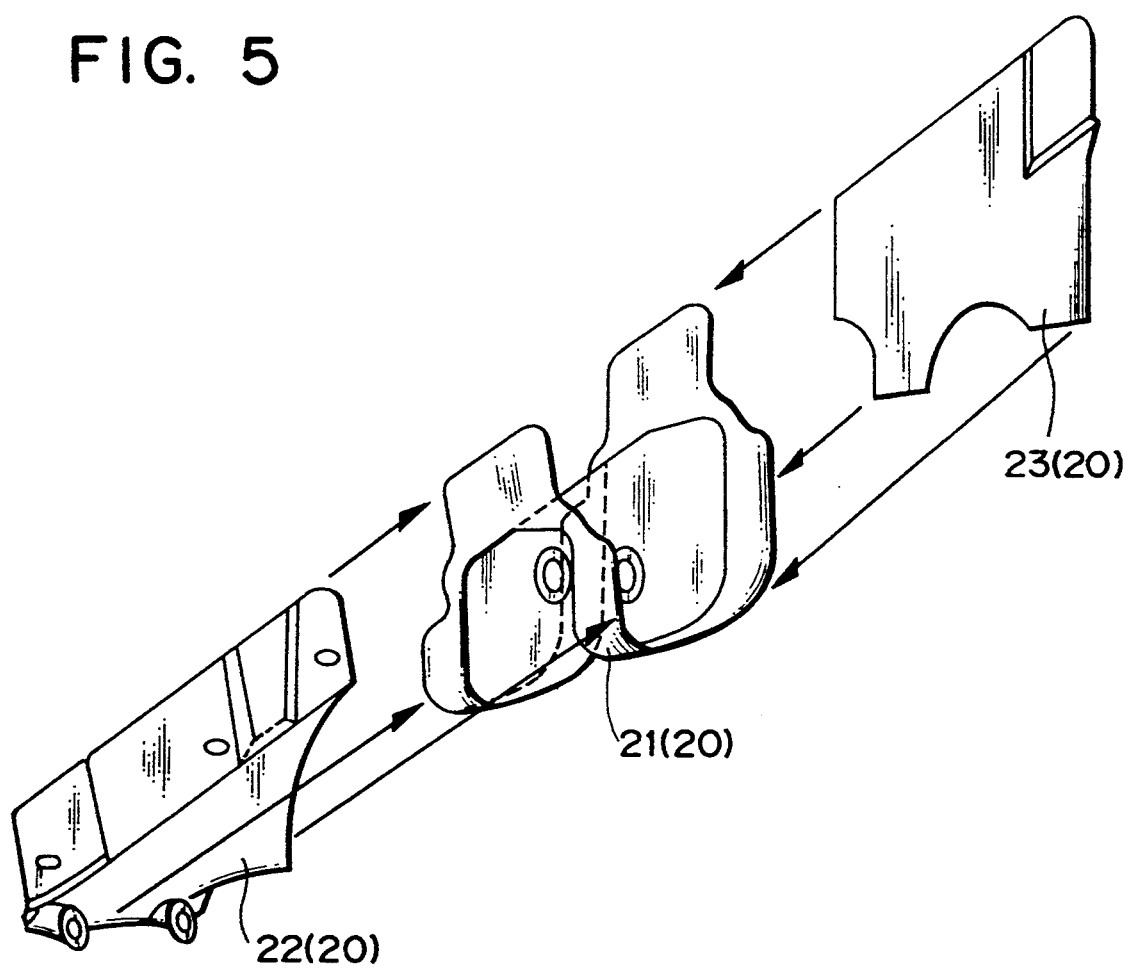
FIG. 5 is an exploded perspective view of a reinforcement bracket.

More specifically, as shown in the exploded perspective view of FIG. 5, the attaching bracket 20 is constituted by a bracket main body 21 for axially supporting the inner end portion of the trailing arm 19 through a rubber bushing, and reinforcement plate members 22 and 23 joined to the right and left ends of the bracket main body 21.

Figure 6:
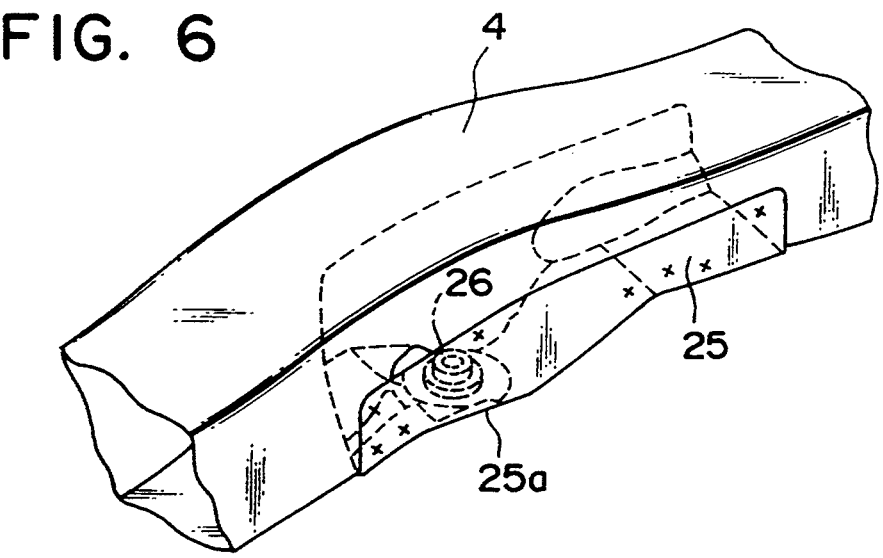
FIG. 6 is a perspective view of the bracket and a rear side frame.

As shown in FIG. 6, of the above-mentioned reinforcement bracket 25, on the front portion joined to substantially the central portion of the kick-up portion 4, a downward projecting attaching portion 25a, to which the front end portion of the arm portion 12a is attached, is formed, and a bolt insertion hole 26 is formed in the attaching portion 25a. Furthermore, the attaching portion 25a has a flat lower surface. Note that bolt insertion holes (not shown) are formed in a portion corresponding to the attaching portion 25a of the reinforcement bracket 25, and substantially the central portion of the kick-up portion 4.

The rear end portions of the right and left longitudinal frame portions 12 of the rear suspension cross member 5 are fastened and fixed to the rear portions of the right and left kick-up portions 4 by bolts 30, and the front end portions of the forward arm portions 12a are fastened and fixed to substantially the central portions of the right and left kick-up portions 4 through the attaching portions 25a of the brackets 25.

In a state wherein the rear suspension cross member 5 is attached to the right and left rear side frame 1, as shown in FIG. 1, the front end portions of the right and left forward arm portions 12a are positioned at substantially the same horizontal level as the bottom of the spare tire storage portion 2a (as indicated by symbol H in FIG. 1). The distance H is somewhat exaggerated for illustrative purposes in FIG. 1 in order to depict the components and their relationships in the embodiment. A portion between the front and rear end portions of each longitudinal frame portion 12 is separated below the corresponding kick-up portion 4 so as to increase a total sectional secondary moment by the rear side frame 1 and the longitudinal frame portion 12.

The operation of the above-mentioned rear portion structure to the vehicle C will be described below. In particular, a case will be exemplified below wherein a rear collision load is applied.

The right and left end portions of the rear suspension cross member 5 correspond to the longitudinal frame portions 12 which comprise the forward arm portions 12a integrally extending toward the front end portions, and are arranged below the corresponding rear side frames 1. The front end portions of the forward arm portions 12a are fixed to substantially the central portions of the kick-up portions 4 of the corresponding rear side frames 1. As a result, the coupling strength between the rear suspension cross member 5 and the right and left rear side frames 1 can be greatly increased.

Therefore, upon rear collision, when a rear collision load acts on the rear suspension cross member 5 through the spare tire storage portion 2a, the rear suspension cross member 5 can be reliably prevented from falling forward, and damage to the fuel tank 10 and the rear portion of the passenger room can be prevented, thus improving safety. Since safety for the fuel tank 10 and the rear portion of the passenger room can be improved, and the spare tire storage portion 2a can be arranged behind the rear suspension cross member 5, when the spare tire is stored in the spare tire storage portion 2a, the rear collision load can be absorbed by the spare tire storage portion 2a and the spare tire first, and then can be absorbed by the rear side frames 1 or the rear suspension cross member 5.

Furthermore, the length of the forward arm portion 12a can be shortened since each forward arm portion 12a of the rear suspension cross member 5 is fixed to substantially the central portion of the kick-up portion 4, thus increasing the mechanical strength. Since the forward arm portions 12a can be integrally formed with the rear suspension cross member 5 with a simple structure, it is advantageous in terms of cost of materials to be used.

The kick-up portion 4 of each rear side frame 1 is reinforced by the corresponding longitudinal frame portion 12, having the forward arm portion 12a, of the rear suspension cross member 5, and is further reinforced by the attaching bracket 20 and the reinforcement bracket 25. The portion between the front and rear end portions of each longitudinal frame portion 12 is arranged to be separated below the corresponding rear side frame 1 by a space portion S (FIG. 4). As a result, the total sectional secondary moment of the rear side frame 1 and the longitudinal frame portion 12 can be remarkably increased. Therefore, an anti-load condition of each kick-up portion 4 against a rear collision load can be greatly relaxed.

Since the reinforcement bracket 25 is coupled to the attaching bracket 20, the coupling strength between the rear suspension cross member 5 and the right and left rear side frames 1 can be further increased.

As indicated by a dotted line in FIG. 6, a receiving portion may be integrally formed at a position corresponding to the forward arm portion 12a. When the receiving portion is arranged in this manner, a rear collision load acting on the rear suspension member 5 can be further efficiently received, and the rear suspension member 5 can be further reliably prevented from falling forward.

Furthermore, the attaching bracket 20 and the reinforcement bracket 25 may be integrally formed on the kick-up portion 4. Alternatively, the reinforcement bracket 25 may be omitted, and an attaching portion for attaching the front end portion of the arm portion 12a may be integrally formed on substantially the central portion of the kick-up portion 4. The overlapping portion between the attaching bracket 20 and the bracket reinforcement 25 may be increased, and may be joined by welding to the kick-up portion 4.

When the trailing arm 19 is not axially supported by the rear side frames 1 in terms of the mechanism of the rear suspension device, another attaching bracket may be arranged on the lower front portion of each of the right and left kick-up portions 4, and may be coupled to the bracket 25.

Note that the rear portion structure of a vehicle is not limited to the front-wheel drive vehicle, but may be applied to a rear-wheel drive vehicle or four-wheel drive vehicle.

As many apparently widely different embodiments of the present invention can be made without departing from the spirit and scope thereof, it is to be understood that the invention is not limited to the specific embodiments thereof except as defined in the appended claims.

What is claimed is:

1. A rear portion structure of a vehicle having a multi-link rear suspension, comprising:

a pair of right and left rear side frames extending along right and left side portions, respectively, of a rear portion of the vehicle, each side frame having a kick-up portion which is inclined upward toward a back of the vehicle;

a rear suspension cross member having attaching portions attached to intermediate portions of said kick-up portions of said rear side frames, said rear suspension cross member extending in a direction substantially perpendicular to a longitudinal direction of said rear side frames, wherein each of said attaching portions of said rear suspension cross member includes a forward and a backward arm portion integrated to form a longitudinal frame portion, and said longitudinal frame portion is integrally formed with said rear suspension cross member; and reinforcement brackets attaching said forward arm portions to said rear side, frames at almost the middle of the intermediate portions of said kick-up portions, said reinforcement brackets extending from said intermediate portion to a back portion of said kick-up portions.

2. The structure according to claim 1, further comprising attaching brackets axially supporting a trailing arm of said rear suspension at a forward portion of said kick-up portions, said attaching brackets welded together with said reinforcement brackets.

3. The structure according to claim 1, further comprising:

a passenger room arranged in front of said rear suspension cross member;

a fuel tank arranged below said passenger room; and a rear-wheel steering device arranged behind said rear suspension cross member.

4. The structure according to claim 1, wherein said multi-link rear suspension is operatively connected to a front-wheel drive vehicle.

5. The structure according to claim 1, wherein said multi-link rear suspension device is operatively connected to a rear-wheel drive vehicle.

6. The structure according to claim 1, further comprising:

a floor panel fixed to said rear side frames; and a spare tire storage portion formed in said floor panel behind said rear suspension cross member.

7. The structure according to claim 6, wherein said forward arm portions are fixed below the intermediate portions of said kick-up portions at substantially the same level as a bottom of said spare tire storage portion.

8. The structure according to claim 1, wherein said forward arm portions and said longitudinal frame portions are arranged such that a space is formed between said rear side frames and central portions of the longitudinal frame portions.

9. The structure according to claim 1, wherein said forward arm portions are attached below the intermediate portions of said kick-up portions through said reinforcement brackets, said reinforcement brackets fixed by welding to said kick-up portions.

* * * * *

UNITED STATES PATENT AND TRADEMARK OFFICE
CERTIFICATE OF CORRECTION

PATENT NO. :  5,364,128
DATED      :  November 15, 1994
INVENTOR(S) :  IDE

It is certified that error appears in the above-indentified patent and that said Letters Patent is hereby corrected as shown below:

Title Page, [56], under "References Cited, U.S. Patent Documents"

4th reference, change "X" to --X12--;
        5th reference, change "X" to --X12--;
        7th reference, change "X" to --X12--;

Col. 2,    line 66, change "drawings, in" to --drawings. In--.

Col. 6,    line 45 (claim 5), delete "device";
               lines 56-57, delete "said forward arm portions and".

Signed and Sealed this

First Day of August, 1995

BRUCE LEHMAN

*Attest:*

*Attesting Officer*      *Commissioner of Patents and Trademarks*